United States Patent [19]
Bahner et al.

[11] Patent Number: 5,226,680
[45] Date of Patent: Jul. 13, 1993

[54] HOSE COUPLING

[75] Inventors: Frank Bahner, Neu-Isenburg; Ralf Hohmann; Ralf Spors, Bruchköbel; Gerhard Winterstein, Bad Vilbel, all of Fed. Rep. of Germany

[73] Assignee: Rasmussen GmbH, Maintel, Fed. Rep. of Germany

[21] Appl. No.: 837,764

[22] Filed: Feb. 18, 1992

[30] Foreign Application Priority Data

Mar. 9, 1991 [DE] Fed. Rep. of Germany ....... 4107603

[51] Int. Cl.$^5$ ............................................... F16L 35/00
[52] U.S. Cl. ...................... 285/93; 285/314; 285/315; 285/423
[58] Field of Search ............... 285/319, 314, 315, 316, 285/86, 34, 35, 423, 93

[56] References Cited

U.S. PATENT DOCUMENTS

| | | | |
|---|---|---|---|
| 2,327,714 | 8/1943 | Iftiger | 285/315 X |
| 2,784,987 | 3/1957 | Corcoran | 285/315 X |
| 4,398,757 | 8/1983 | Floyd | 285/315 |
| 4,451,069 | 5/1984 | Melone | 285/315 X |
| 4,681,350 | 7/1987 | Goita | 285/315 |
| 5,029,904 | 7/1991 | Hunt | 285/314 X |

FOREIGN PATENT DOCUMENTS 1912316 9/1970 Fed. Rep. of Germany .
3741250 6/1989 Fed. Rep. of Germany .

Primary Examiner—Dave W. Arola
Attorney, Agent, or Firm—Peter K. Kontler

[57] ABSTRACT

A hose coupling wherein a sleeve is made of one piece with axially parallel elastic arms engageable with an external rib of a pipe which is inserted into one end portion of the sleeve. The other end portion of the sleeve is sealingly connected with and surrounds an end of a hose, and the sleeve is surrounded by a turnable or axially movable locking ring having prongs which are caused to bear against the adjacent arms so that the arms are urged against the rib. The sleeve has one or more elastic tongues which can snap behind the adjacent portion or portions of the locking ring to hold the ring in the operative position and to indicate that the ring is maintained in the operative position. The arms have internal grooves for reception of adjacent portions of the rib. The prongs are provided with internal projections which must ride over ramps and hurdles on the respective arms during translatory or angular movement of the locking ring to its operative position, and the arms are further provided with stops which arrest the respective projections when the ring reaches its operative position.

16 Claims, 6 Drawing Sheets

HOSE COUPLING

CROSS-REFERENCE TO RELATED CASE

The coupling of the present invention constitutes an improvement over and a further development of the device which is disclosed in commonly owned copending patent application Ser. No. 07/788,822 filed Nov. 7, 1991 by Ralf Hohmann et al. for "Hose coupling".

BACKGROUND OF THE INVENTION

The invention relates to improvements in hose couplings or similar couplings in general, and more particularly to improvements in couplings of the type wherein one of the tubular components to be sealingly connected to each other is provided with an external retaining part which can be engaged by one or more radially outwardly and inwardly movable arms or claws on a sleeve-like coupling member. Still more particularly, the invention relates to improvements in couplings which are provided with locking elements in the form of rings or like parts capable of being shifted relative to and around the respective sleeve-like coupling members to permit or prevent disengagement of the arms from the external retaining part of the one tubular component. Couplings of the above outlined character are normally provided with O-rings or with other suitable elastic sealing elements which prevent leakage of fluid from the tubular components into the atmosphere or in the opposite direction when the arms engage the external retaining part and the locking element is maintained in a position in which the arms are urged toward the peripheral surface of the adjacent tubular component.

A drawback of certain presently known couplings of the above outlined character is that, when the coupling is used to establish a separable sealing connection between two tubular members (e.g., between a flexible elastic hose and a rigid metallic pipe), unavoidable manufacturing tolerances (even minor tolerances) enable the pipe to become tilted relative to the sleeve-like coupling member and/or the locking element to become tilted relative to the coupling member. This is often compounded by extensive wear upon the parts of the coupling and/or tubular components as a result of repeated engagement and disengagement of the coupling so that the axis of one of the two interconnected tubular components no longer coincides with the axis of the other tubular component. This entails non-uniform stressing of the sealing elements and results in leakage of the confined fluid or in penetration of atmospheric air into the pipeline. The situation is aggravated if the coupling is utilized under the hood of or elsewhere in a motor vehicle, e.g., to establish a path for the flow of fuel, oil or coolant, because the coupling is subject to continuous vibration when the engine is on and/or when the vehicle is in motion. Non-uniform deformation of the sealing element or elements is likely to persist if the sealing elements are cooled in cold climates well below the freezing point. This results in hardening of sealing elements (normally O-rings) and in pronounced leakage of confined fluid when the vehicle is in motion or the engine is on. Leakage of fuel or another fluid in a motor vehicle can have serious consequences.

Another drawback of the just described conventional couplings is their cost. The cost is relatively high because the retaining arms are separately produced parts and the locking element must be biased to its operative position by one or more springs.

In accordance with another prior proposal (reference may be had to German patent application No. 37 41 250 of Rösch published Jun. 15, 1989), the locking element surrounds the arms in such a way that the arms are free to move radially inwardly and outwardly in the internal space of the locking element when the latter is maintained in the inoperative position. When the locking element is shifted to the operative position, an internal surface of such element prevents radially outward movements of the arms so that the arms are compelled to remain in engagement with an external rib on one of the tubular components, e.g., on a metallic pipe which is to be sealingly coupled to a flexible hose. The internal surface of the locking element has a frustoconical shape and is dimensioned to force the arms toward the pipe as soon as the locking element assumes its operative position. The external surface of the tubular coupling member is provided with alternating annular ribs and grooves cooperating with complementary annular grooves and ribs of the locking element to maintain the latter in a selected axial position. The cooperating ribs and grooves are intended locking element from its operative or inoperative position. A drawback of such proposal is that the operator must exert a pronounced force in order to move the locking element axially of the tubular sleeve-like coupling member. Moreover, the operative position of the locking element relative to the coupling member must be changed at certain intervals in order to compensate for wear upon such parts and/or to compensate for manufacturing tolerances. The coupling of Rösch comprises a substantial number of separately produced parts which contributes to the initial cost. Certain parts are to be secured to each other by form-locking connections, or the parts must be secured to each other by glue, which also contributes to the initial cost. Moreover, the establishment of a reliable form-locking connection, or of a connection which relies on adhesive, necessitates the making of parts to be secured to each other with a rather high degree of accuracy. All this is necessary in order to prevent wobbling of the coupled-together tubular components because such wobbling can affect the sealing action of the O-rings and can entail the development of paths for the leakage of fluid between the interior of the tubular components and the surrounding atmosphere.

German patent application No. 1 912 316 of Stephany (published Sep. 20, 1970) discloses a coupling for the establishment of a leakproof connection between a hose and a pipe which is provided with an external retaining rib. The coupling comprises a tubular coupling member which carries radially movable axially extending elastic arms serving to engage an external rib of the pipe. A ring-shaped locking element surrounds the coupling member and is movable axially of the coupling member between operative and inoperative positions. The arms can move apart to be disengaged from the external rib of the pipe when the locking element is moved to the inoperative position. The locking element has rigid straight internal ribs which bear upon the arms in the operative position of the locking element to prevent disengagement of the arms from the rib at the exterior of the pipe. The internal ribs surround the respective arms with a certain amount of clearance because the locking element must remain free to turn relative to the tubular coupling member. It has been found that extensive wear upon the parts of the coupling which is disclosed by Stephany, in addition to manufacturing tolerances, results in the establishment of paths for leakage of confined fluid after a relatively short period of use. More specifically, the pipe is free to wobble relative to the coupling member and to thus affect the action of one or more O-rings which are installed between the pipe and the coupling member.

OBJECTS OF THE INVENTION

An object of the invention is to provide a coupling, particularly a hose coupling, which is less likely to permit leakage of confined fluid than heretofore known couplings.

Another object of the invention is to provide a coupling which prevents leakage of confined fluid even if its parts are not machined and/or otherwise shaped with a very high degree of accuracy.

A further object of the invention is to provide a coupling which exhibits the above outlined advantages even though it comprises a minimal number of relatively simple and inexpensive parts.

An additional object of the invention is to provide a coupling which is designed to prevent tilting of one of the interconnected tubular components relative to the other component and/or relative to the elements of the coupling.

Still another object of the invention is to provide a novel and improved tubular coupling member for use in the above outlined coupling.

A further object of the invention is to provide a novel and improved locking element for use in the above outlined coupling.

An additional object of the invention is to provide the above outlined coupling with novel and improved means for maintaining the locking element in a selected position relative to the tubular coupling member.

Another object of the invention is to provide a novel and improved method of preventing tilting of interconnected tubular components relative to each other and relative to the parts of the above outlined coupling.

A further object of the invention is to provide a coupling wherein the exertion of a relatively small force suffices to connect the tubular coupling member with or detach the coupling member from one of the interconnected tubular components, and wherein a relatively small force is required to move the locking element between its operative and inoperative positions.

Still another object of the invention is to provide the above outlined coupling with novel and improved means for reliably connecting the coupling member to a flexible hose.

An additional object of the invention is to provide a coupling which can be rapidly assembled or taken apart with the exertion of relatively small forces and without the need for any tools or by resorting to readily available rudimentary tools.

Another object of the invention is to provide a coupling wherein the position of the locking element, and hence the condition of the coupling, can be ascertained at a glance or can be ascertained by resorting to automatic monitoring means.

A further object of the invention is to provide a hose coupling which can be utilized with particular advantage in motor vehicles.

Another object of the invention is to provide a coupling which can stand very high or very low temperatures without affecting its sealing action.

An additional object of the invention is to provide a device, e.g., a conveyance, which embodies one or more couplings of the above outlined character.

A further object of the invention is to provide a coupling which can be installed in existing pipelines as a superior substitute for heretofore known couplings.

Still another object of the invention is to provide the above outlined coupling with novel and improved means for reliably guiding the locking element during movement relative to the tubular coupling member.

A further object of the invention is to provide a coupling wherein the coupling member cooperates with the locking element to prevent unintentional dismantling of the coupling in actual use with a pronounced force but the movements of the locking element from operative position and/or the movements of the coupling member away from engagement with a tubular component necessitate the exertion of a relatively small force.

SUMMARY OF THE INVENTION

The invention is embodied in a coupling which can be utilized to connect an end of a first tubular component (e.g., a component including a flexible elastically deformable hose) with a second tubular component (such as a metallic nipple or pipe) having an end provided with an external retaining part, such as a circumferentially extending rib or corrugation). The improved coupling comprises a tubular member (e.g., a sleeve of plastic material) including a first end portion which is connectable with the end of the first component (the end of the first component can be dimensioned to be receivable in the first end portion of the tubular member), a second end portion designed to receive the end of the second component, and substantially axially extending radially flexible elastic arms which yieldably engage the retaining part when the second end portion receives the end of the second component. The arms are or can be of one piece with the second end portion of the tubular member, and the coupling further comprises at least one annular sealing element which is receivable between the second end portion of the tubular member and the end of the second component so that the at least one sealing element surrounds the end of the second component, an annular locking element which surrounds and is movable relative to the tubular member between first and second positions, and elastic prongs which are preferably of one piece with and extend substantially axially of the locking element. Each prong overlies and yieldably bears against one of the arms in the first position but permits radially outward movement of the respective arm in the second position of the locking element.

At least one of the prongs can be provided with an internal projection and at least one of the arms can be provided with an external hurdle over which the projection is caused to advance during movement of the locking element between its first and second positions.

The coupling preferably further comprises means for preventing movements of the locking element beyond the first position in a direction away from the second position. Such movement preventing means can comprise a stop on at least one of the arms or elsewhere on the tubular member.

The inner sides of the arms can be provided with grooves which receive portions of the external retaining rib when the end of the second component is received in the second end portion of the tubular member.

The tubular member can be provided with a window and with a tongue in the window. The tongue is movable relative to the window between a radially outer position in which the tongue blocks the movement of the locking element to the second position and a radially inner position in which the locking element is free to move to the second position. The tongue is preferably elastic and can be of one piece with the end portions of the tubular member. Furthermore, the tongue is preferably formed in such a way that it tends to assume one of its positions, particularly the radially outer position. The arrangement is preferably such that the locking element at least partially conceals the tongue from view in one of the first and second positions; for example, the locking element can overlie and at least partially conceal the tongue in the second position of the locking element.

The locking element can be provided with at least one follower and the tubular member can be provided with means for guiding the at least one follower so that the latter cooperates with the guiding means to confine the locking element to movement along a predetermined path between its first and second positions. The at least one follower can include a projection (such as the aforementioned internal projection) on one of the prongs, and the guiding means can comprise a track (e.g., in the form of a channel) for the projection.

In accordance with one presently preferred embodiment of the invention, the locking element is rotatable on the tubular member between the first and second positions. Alternatively, the coupling can be designed in such a way that the locking element is reciprocable (preferably axially of the tubular member) between its first and second positions.

The tubular member can be provided with at least one socket (such as the aforementioned window or a radial hole or bore in the first end portion of the tubular member), and the coupling preferably further comprises means (such as a tubular deforming insert in the end of the first component) for deforming a portion of the first component into the at least one socket.

The novel features which are considered as characteristic of the invention are set forth in particular in the appended claims. The improved coupling itself, however, both as to its construction and the mode of assembling and operating the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
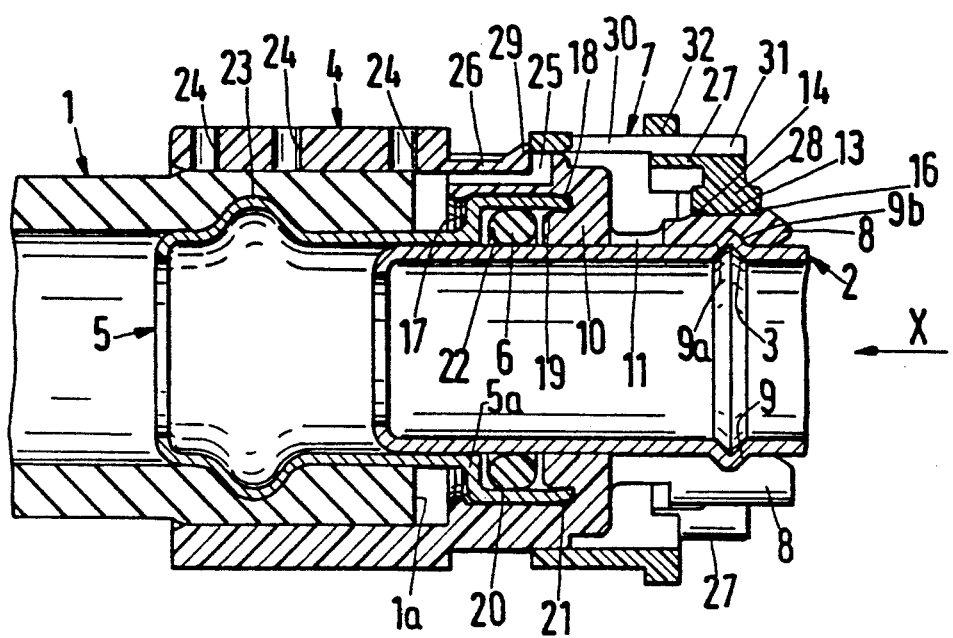
FIG. 1 is an axial sectional view of a coupling which embodies one form of the invention and is installed between one end of a flexible hose and one end of a metallic pipe, the locking element being shown in the first position and the tongue of the tubular member being shown in the radially outer position.
Figure 2:
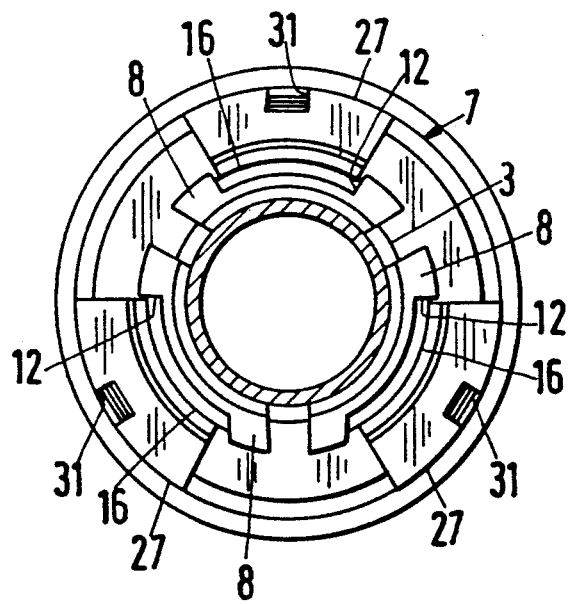
FIG. 2 is an end elevational view as seen in the direction of arrow X in FIG. 1.

The coupling which is shown in FIGS. 1, 2, 6, 7 and 8 serves to separably and sealingly connect the illustrated end of a first tubular component in the form of a flexible elastically deformable hose 1 of plastic or other suitable material with one end of a second tubular component here shown as a metallic pipe 2, e.g., with one end of a nipple under the hood of a motor vehicle. The illustrated end of the pipe 2 has an external retaining part 3 in the form of a circumferentially complete corrugation or rib which is spaced apart from the tip of the pipe and is surrounded by the three angularly spaced apart substantially axially parallel elastically deformable arms 8 on an elongated sleeve-like tubular member 4 (hereinafter called sleeve for short). The sleeve 4 has a first end portion which surrounds the illustrated end of the hose 1 and a second end portion which is of one piece with the first end portion and with the arms 8 and surrounds the pipe 2 between the rib 3 and the hose when the coupling is fully assembled (as shown in FIGS. 1 and 2). The illustrated rib 3 has a substantially V-shaped cross-sectional outline; however, it is equally within the purview of the invention to employ a rib having a sawtooth-shaped, substantially semispherical or other suitable cross-sectional outline. Such rib can be formed by a suitable tool which is introduced through the open tip of the pipe 2 and is thereupon caused to expand into deforming engagement with the internal surface of the pipe.

The coupling further comprises a preferably thin-walled tubular metallic deforming member or insert 5, a ring-shaped elastically deformable sealing element 6 here shown as an O-ring, and a preferably plastic ring-shaped locking element 7 (hereinafter called ring for short). It is possible to make the sleeve 4 and/or the ring 7 of a suitable metallic material; however, plastic constituents 4 and 7 are preferred at this time because they can be mass-produced in available machines at a low cost and with a requisite degree of accuracy without any machining.

Figure 8:
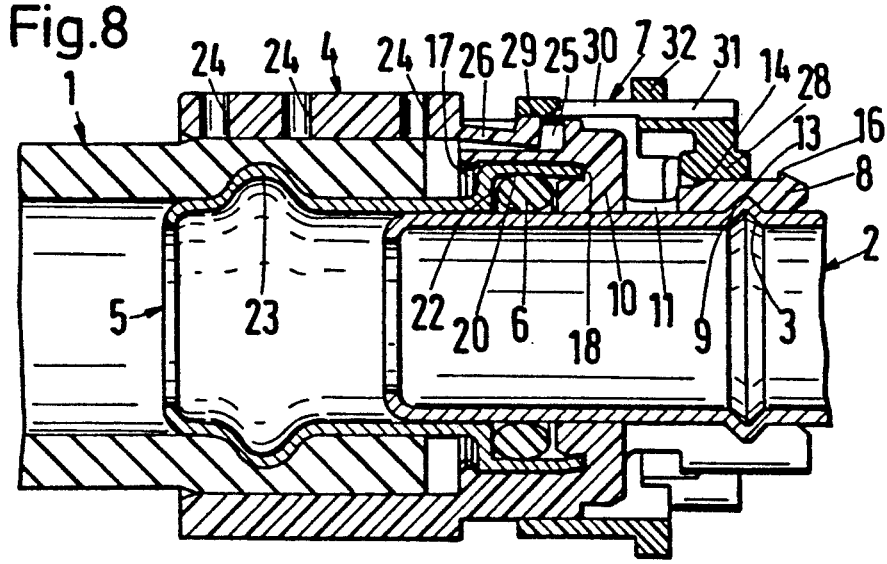
FIG. 8 illustrates the structure of FIGS. 1 and 6 with the pipe in fully inserted position and with the locking element between its first and second positions.

The arms 8 are equidistant from each other in the circumferential direction of the sleeve 4 and tend to assume, or to move radially inwardly beyond, the positions which are shown in FIGS. 1 and 2, namely those positions in which the internal grooves 9 of the arms 8 receive and these arms bear against the exterior of the respective portions of the retaining rib 3. The sleeve 4 carries three arms 8; however, the number of these arms can be increased or reduced without departing from the spirit of the invention. The outlines of the surfaces bounding the grooves 9 are preferably complementary to the outline of the external surface of the rib 3. This ensures reliable retention of the rib 3 in the grooves 9 when the sleeve 4 and the pipe 2 assume the axial positions which are shown in FIGS. 1 and 8. The free ends of the arms 8 have a substantially trapeziform shape and are provided with radially outwardly flaring edge faces to facilitate insertion of the pipe 2 into the space within the arms 8 and into the right-hand end portion of the sleeve 4, i.e., into that end portion which carries and is of one piece with the arms 8.

The second end portion of the sleeve 4 comprises a radially inwardly extending annular wall 10 having a radially innermost portion which is of one piece with and is immediately adjacent the arms 8. These arms are provided with slots 11 (see particularly FIGS. 3 and 4) which enhance their flexibility in the region closely or immediately adjacent the wall 10. The radially outer sides of the arms 8 are provided with tracks in the form of channels 12 which serve as a means for guiding followers in the form of radially inwardly extending projections 28 provided at the free ends of axially parallel elastic prongs 27 which are of one piece with the ring 7. The channels 12 extend in parallelism with the axis of the sleeve 4 and the arms 8 are further provided with circumferentially extending recesses 13 which are formed in the surfaces bounding the radially innermost portions of the respective channels 12. Each recess 13 is flanked by a barrier or hurdle 14 adjacent a conical ramp 15 provided at that side of the recess 13 which is nearer to the sleeve 4, and the other side of each recess 13 is flanked by a stop 16 which serves as a means for preventing movements of the ring 7 beyond a (first) position (shown in FIG. 1) in a direction away from a second position (shown in FIG. 6).

The sleeve 4 has a radially inwardly extending annular bead 17 which is spaced apart from the wall 10 in a direction away from the arms 8. That side of the wall 10 which confronts the bead 17 is formed with an annular socket 18 for the adjacent cylindrical end portion 20 of the deforming member 5 when the latter is properly installed in the sleeve 4 and in the illustrated end of the hose 1 so that a radially outwardly bent corrugation 23 of the member 5 urges the external surface of the hose into sealing engagement with the left-hand end portion of the sleeve as shown in FIG. 1. The corrugation 23 is formed by a suitable tool or by a suitable machine subsequent to insertion of approximately one-half of the deforming member 5 into the hose 1. The radially innermost part of the open end of the socket 18 in the wall 10 is bounded by a radially outwardly flaring frustoconical ramp 19 which can expand the respective end portion 20 of the deforming member 5 radially outwardly while the deforming member is in the process of entering the socket to assume the end position which is shown in FIG. 1.

The cylindrical right-hand end portion 20 of the deforming member 5 has a diameter which exceeds the diameter of the major portion of the deforming member and is selected in such a way that the end portion 20 must undergo some radial contraction and/or the sleeve 4 must undergo a certain radial expansion in order to force the end portion 20 through the annular bead 17 and toward and into the socket 18. The axial length of the end portion 20 is selected in such a way that this end portion is located to the right of the bead 17 when the deforming member 5 is properly inserted into the sleeve 4, i.e., when the rightmost part of the end portion 20 is properly received in the socket 18. The free end of the end portion 20 is provided with an external frustoconical ramp 21 which facilitates introduction into the socket 18.

When the operator or a machine is in the process of assembling the deforming member 5 and the hose 1 with the sleeve 4, the cylindrical end portion 20 of the deforming member first undergoes radially inward deformation during passage through the bead 17. This moves the free end of the end portion 20 of the advancing member 5 into the range of the ramp 19 which expands the end portion 20 radially outwardly during the last stage of insertion of the deforming member 5 into the sleeve 4. Since the material of the sleeve 4 preferably exhibits at least some elasticity, the bead 17 can undergo a certain radial expansion during passage of the end portion 20 to thereupon contract and reliably retain the end portion 20 in the axial position of FIG. 1 in which the end portion 20 extends in part into the socket 18 and must undergo deformation by and/or must deform the bead 17 in order to permit extraction of the deforming member 5 from the sleeve 4.

When the insertion of the end portion 20 into the socket 18 is completed, the radial wall 5a of the deforming member 5 and the wall 10 of the sleeve 4 flank an annular chamber or compartment 22 for the sealing element 6. The latter is deformed to bear against the external surface of the pipe 2 as well as against the internal surface of the cylindrical end portion 20 in order to prevent leakage of a conveyed gaseous or hydraulic fluid from the hose 1 and/or pipe 2 into the surrounding atmosphere.

The illustrated end of the hose 1 can be introduced into the annular space between the deforming member 5 and the left-hand end portion of the sleeve 4 subsequent to completed introduction of the cylindrical end portion 20 into the socket 18. The insertion of the hose 1 is completed when its edge face or end face 1a is closely or immediately adjacent the bead 17. It will be noted that insertion of the hose 1 into the sleeve 4 takes place in the same direction as the insertion of the deforming member 5, namely in a direction toward the arms 8 on the wall 10 (right-hand end portion) of the sleeve. The making of the corrugation 23 is carried out in the next step (the tool which is used to make this corrugation is or can be introduced into the deforming member 5 in a direction to the left (as seen in FIG. 1) prior to insertion of the end of the pipe 2. The corrugation 23 can be formed by a rolling or any other suitable tool or machine and is sufficiently pronounced to ensure the establishment of a reliable sealing engagement between the external surface of the hose 1 and the internal surface of the cylindrical or substantially cylindrical left-hand end portion of the sleeve 4. The next step involves insertion of the left-hand end of the pipe 2 into the space within the arms 8 and into the right-hand end portion of the sleeve 4 until the external retaining rib 3 snaps into the internal grooves 9 of the arms 8. This is shown in FIGS. 1 and 8.

When the assembly of the coupling with the sleeve 1 and pipe 2 is completed, the bead 17 cooperates with the cylindrical end portion 20 of the deforming member 5 to prevent unintentional extraction of the end portion 20 from the socket 18 and from the sleeve 4. Thus, separation of the hose 1 and deforming member 5 from the sleeve 4 necessitates the exertion of a very pronounced force acting upon the hose in a direction to the left, as seen in FIG. 1. Such force must suffice to enable the cylindrical end portion 20 to undergo deformation and/or to deform the bead 17 so that the end portion 20 can be caused to move to a position at the left-hand side of the bead 17. Further extraction of the hose 1 from the sleeve 4 necessitates the exertion of a force which suffices to overcome the friction between the external surface of the hose and the internal surface of the sleeve radially outwardly of the corrugation 23.

The deforming member 5 can be provided with two or more corrugations 23, depending upon the desired magnitude or extent of sealing engagement between the hose 1 and the sleeve 4, i.e., depending on the magnitude of the force which is required to extract the hose from the left-hand end portion of the sleeve. A very pronounced frictional and sealing engagement between the hose 1 and the sleeve 4, in the region of the corrugation(s) 23, is often desirable if the fluid which is caused to flow from the hose 1 into the pipe 2 (or in the opposite direction) is maintained at an elevated pressure.

Figure 3:
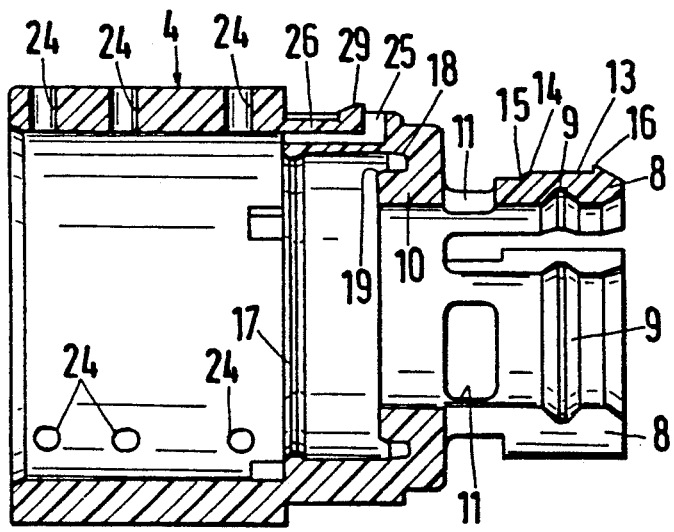
FIG. 3 is an axial sectional view of the tubular member in the coupling which is shown in FIGS. 1 and 2.
Figure 5:
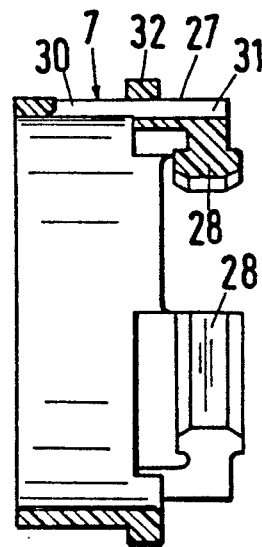
FIG. 5 is an axial sectional view of the locking element in the coupling which is shown in FIGS. 1 and 2.
Figure 4:
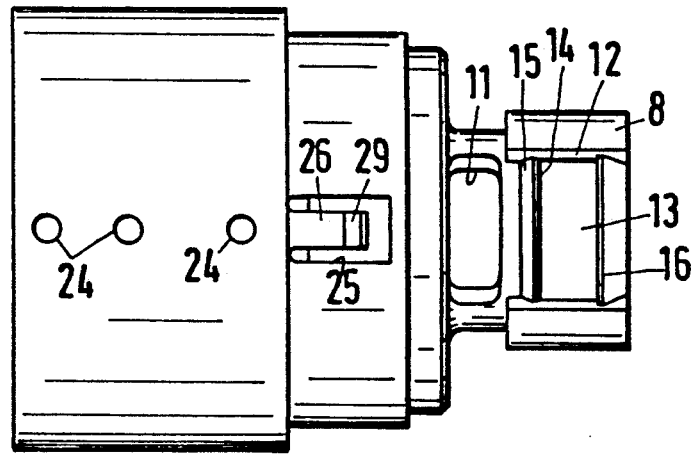
FIG. 4 is a plan view of the tubular member which is shown in FIG. 3.

As can be best seen in FIGS. 3 and 4, the sleeve 4 can be provided with one, two or more sockets 24 in the form of radially extending bores or holes at least some of which are adjacent the corrugation 23 to invariably receive some material of the hose 1 and to thus further reduce the likelihood of accidental or unintentional separation of the hose and deforming member 5 from the sleeve 4. Thus, those portions of the hose 1 which penetrate into the adjacent holes or sockets 24 can be said to establish a desirable form-locking connection between the hose and the deforming member 5 on the one hand, and the respective end portion of the sleeve 4 on the other hand.

The just discussed form-locking connection between the hose 1 and the sleeve 4 is or can be enhanced by a window 25 which is provided in the sleeve 4 and can also receive the adjacent portion of the hose 1. The window 25 is in the form of an axially parallel slot (see FIG. 4) which confines or partially confines an elastically deformable tongue 26. The latter is of one piece with the sleeve 4 and can be flexed to a radially outer position (see FIGS. 1, 3, 6 and 7) or to a radially inner position (see FIG. 8). The window 25 can be formed by providing the respective part of the sleeve 4 with a substantially U-shaped slit, and the making of such slit automatically entails the formation of the tongue 26. The arrangement is preferably such that the elastic tongue 26 exhibits a tendency to assume the radially outer position of FIG. 1 and to thus block or at least strongly oppose the movement of the ring 7 from the first position of FIG. 1 to the second position of FIG. 6. The free end of the tongue 26 can be provided with a radially outwardly extending protuberance 29 which is located in the path of movement of the ring 7 from the first position of FIG. 1 to the second position of FIG. 6 when the tongue 26 is permitted to assume the radially outer position of FIG. 1.

Figure 6:
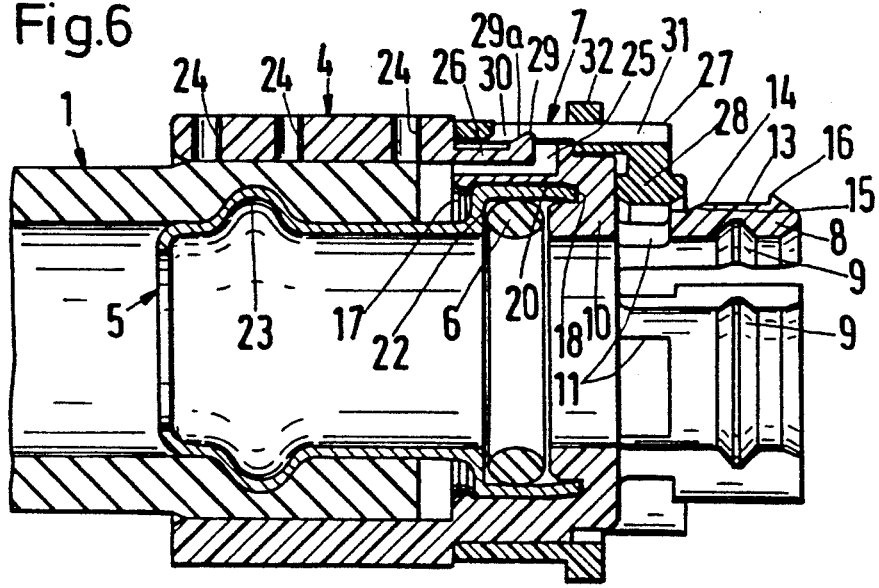
FIG. 6 illustrates the structure of FIG. 1 without the pipe and with the locking element shown in the second position.

The ring 7 is maintained in the second position of FIG. 6 prior to insertion of the pipe 2 between the arms 8 and into the right-hand end portion of the sleeve 4. This ring carries three axially parallel prongs 27, one for each of the arms 8, and each such prong is provided with an opening 30 which communicates with a slot 31 at that end which is remote from the window 25 in the sleeve 4. The free ends of the prongs 27 carry the projections 28 which also serve as followers in that they can extend into and can be guided by the external channels 12 of the respective arms 8. The width of each projection 28 is such that it can readily enter the circumferentially extending recess 13 of the respective arm 8.

The ring 7 has an annular handgrip portion 32 which can be corrugated and can be grasped by hand or engaged by a suitable tool in order to facilitate the task of moving the ring between the first position of FIG. 1 and the second position of FIG. 6.

The improved coupling is manipulated in the following way:

The ring 7 is moved axially of the sleeve 4 to the second position of FIG. 6 before the pipe 2 is inserted between the arms 8 and into the right-hand end portion of the sleeve 4. It is assumed that the hose 1 already extends into the left-hand portion of the sleeve 4 and that the deforming member 5 is already inserted into the sleeve and deforms the hose in a manner as shown in FIG. 6. At such time, the radially outwardly extending protuberance 29 of the tongue 26 is received in one of the openings 30. The sleeve 4 can have a discrete window 25 and a tongue 26 for each prong 27.

Figure 7:
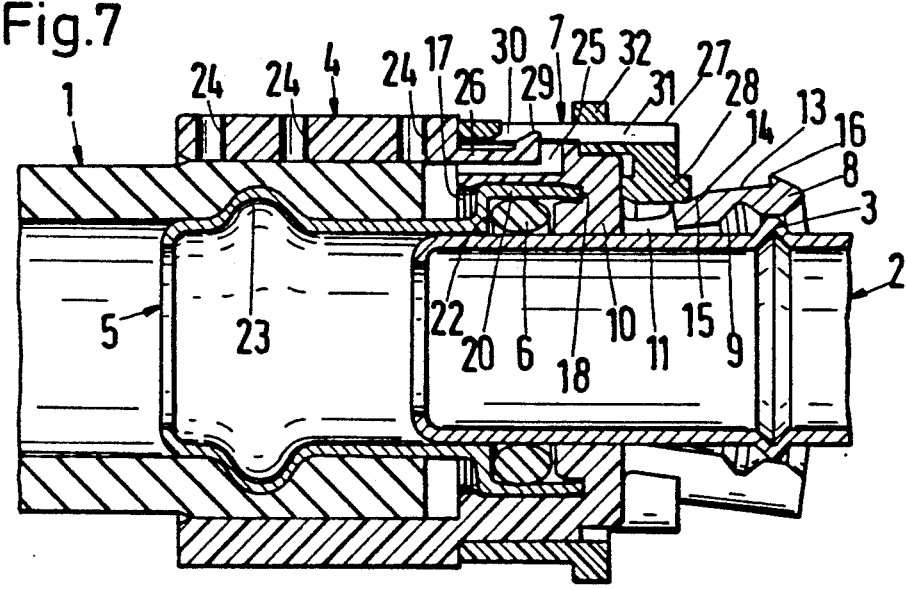
FIG. 7 illustrates the structure of FIG. 1 but with the pipe only partially inserted into the tubular member and with the locking element in the second position.

The pipe 2 is thereupon inserted into the space between the arms 8 and into the respective end portion of the sleeve 4, or the sleeve 4 is slipped onto the pipe. An intermediate stage of insertion of the pipe 2 is shown in FIG. 7, i.e., the rib 3 is located to the right of the grooves 9 in the internal surfaces of the arms 8 and these arms are expanded radially of and away from the axis of the sleeve 4. Such radially outward movements of the free ends of the arms 8 are not opposed (or are not appreciably opposed) by the respective prongs 27 because the prongs are retracted to the left, i.e., their projections or followers 28 are not received in the recesses 13 of the respective arms 8. The configuration of the edge faces at the free ends of the arms 8 is such that these arms can be readily moved radially outwardly by the external surface of the rib 3 while the pipe 2 is in the process of advancing toward the axial position of FIGS.

1 and 8 (in which the rib 3 is properly received in the grooves 9 of all three arms 8).

The arms 8 tend to move radially inwardly so that their grooves automatically receive the adjacent portions of the rib 3 when the insertion of the pipe 2 into the sleeve 4 is completed. Such tendency of the arms 8 to properly engage the rib 3 of the inserted pipe 2 can be readily achieved by making the sleeve 4 and its integral arms 8 in such a way that the diameter of the space within the unstressed arms 8 is slightly smaller than the outer diameter of the pipe 2 and/or that the outer diameter of the pipe is slightly greater than the nominal diameter. In other words, all that is necessary is to select the tolerances of the arms 8 and pipe 2 in such a way that the diameter of the space within the arms 8 is below the norm and the outer diameter of the pipe is above the norm.

The ring 7 is thereupon moved from the position of FIG. 6 or 7 to the position of FIG. 1 through the intermediate position of FIG. 8. As can be best seen in FIGS. 6, 7 and 8, the ring 7 is undercut in the region of the left-hand side or end of the opening(s) 30 so that the suitably configurated ramp 29a of the protuberance 29 can be depressed in response to movement of the ring 7 from the position of FIG. 6 toward the position of FIG. 1. FIG. 8 shows the tongue 26 and its protuberance 29 in the radially inner (depressed) positions and the tongue thereupon snaps to the radially outer position of FIG. 1 as soon as the ring 7 reaches its first position. This enables the protuberance 29 to act as a stop or blocking means to unintentional or accidental movement of the ring 7 axially of the sleeve 4 and back to the second position of FIG. 6.

As the ring 7 moves from the second position of FIG. 6 toward the first position of FIG. 1, the projections or followers 28 of the prongs 27 are confined in and are guided by the respective channels or tracks 12 and are caused to ride over the respective hurdles 14 in a direction first over the ramps 15 and into the respective recesses 13 to be arrested by the respective stops 16 so that the ring 4 is prevented from moving beyond the first position (in a direction away from the second position of FIG. 6). The prongs 27 undergo elastic deformation while their projections 28 ride over the respective hurdles 14, and the projections 28 are thereupon propelled radially inwardly to enter their sockets 13 and to come into abutment with or close to the respective stops 16. The arrangement is preferably such that the prongs 27 remain at least slightly stressed to urge their projections 28 into the respective recesses 13 when the movement of the ring 7 to the first position of FIG. 1 is completed. This ensures that the arms 8 even more reliably engage the retaining rib 3 of the properly (fully) inserted pipe 2. Such at least partial stressing of the prongs 27 in the first position of the ring 7 can be readily achieved by underdimensioning the projections 28 and/or by overdimensioning the arms 8.

The tongue 28 and its protuberance 29 are located in the path of movement of the ring 7 from the first position of FIG. 1 so that such ring can be moved to the second position only on purpose, i.e., in that the tongue 26 is depressed (by hand or by a tool) to its radially inner position by a suitable tool or in any other way so as to enable the adjacent portion of the ring 7 and/or the adjacent prong 27 to ride over the protuberance in a direction toward the hose 1.

If the pipe 2 is to be disengaged from the hose 1, the tongue or tongues 26 are depressed to their radially inner positions, either by hand or by a pin, stud or another suitable tool, not shown, so that the ring 7 can be slid from the position of FIG. 1 to the position of FIG. 6 because the ring can ride over the protuberance(s) 29 of the tongue(s) 26. This moves the projections 28 of the prongs 27 away from the respective recesses 13 so that the arms 8 can be moved apart by the rib 3 in response to a pull upon the pipe 2 (in a direction to the right, as seen in FIG. 1 or 8). The handgrip portion 32 simplifies the task of shifting the ring 7 between the positions of FIGS. 1 and 6.

As can be seen in FIG. 7, insertion of the pipe 2 into the sleeve 4 (while the ring 7 is maintained in the second position) merely necessitates overcoming the resistance of the arms 8 to movement toward their radially outermost positions which are shown in FIG. 7. Once the rib 3 snaps into the grooves 9, the arms 8 assume their radially inner positions and the ring 7 can be shifted to the first position in response to exertion of a relatively small force because such shifting merely necessitates a movement of the projections 28 over the respective hurdles 14 and into the respective recesses 13 until they reach the corresponding stops 16. Radially outward movements of the projections 28 during movement of the ring 7 to the first position of FIG. 1 are facilitated by the ramps 15 which are immediately adjacent the respective hurdles 14. The just described two-stage application of forces is desirable and advantageous because a relatively small force suffices to move the arms 8 apart to the positions of FIG. 7 and a relatively small force suffices to thereafter move the projections 28 from the positions of FIG. 7, through the positions of FIG. 8, and all the way to the positions of FIG. 1. Nevertheless, once the ring 7 assumes the position of FIG. 1, the arms 8 are biased toward or against the peripheral surface of the pipe 2 with a considerable force, namely due to innate elasticity of the arms 8 and their tendency to move radially inwardly, and due to innate elasticity of the prongs 27 and their tendency to urge the projections 28 against the respective arms 8. The exertion of a substantial force upon the peripheral surface of the pipe 2 and/or upon the rib 3 is desirable and advantageous because this ensures that the pipe is not likely to be tilted relative to the ring 4 and relative to the adjacent end of the hose 1. In other words, the pipe 2 is compelled to remain coaxial with the sleeve 4 even if the sleeve and/or the pipe is acted upon by substantial radially oriented forces. This, in turn, ensures that the O-ring 6 is subjected to uniform deforming stresses all the way along the internal surface of the cylindrical end portion 20 of the deforming member 5 to thus reliably prevent leakage of a fluid medium from the pipe 2 and hose 1 into the surrounding atmosphere or in the opposite direction.

The tongue or tongues 26 can perform an additional desirable function, namely that of serving as markers or indicators of the momentary position of the ring 7. As can be seen in FIGS. 1 and 8, the illustrated tongue 26 is readily observable when the ring 7 assumes or approaches its first end position. On the other hand, the illustrated tongue 26 is at least partially concealed (overlapped) by the ring 7 and/or by one of the prongs 27 when the ring assumes the second position of FIG. 6. The possibility of readily ascertaining the axial position of the ring 7 is of particular importance when the improved coupling is used in an assembly plant, e.g., in an automobile assembly plant, because the person(s) in charge or an automatic monitoring device can immediately ascertain whether or not the coupling is fully assembled, i.e., whether or not the ring 7 at least partially conceals the tongue or tongues 26. The outer side of each tongue 26 can be coated with a layer of coloring matter to further simplify the task of detecting the axial position of the ring 7. Furthermore, it is equally possible to design the ring 7 and the prongs 27 thereon in such a way that the tongue or tongues 26 are at least partially concealed in the first position (FIG. 1) of the ring and that the tongue or tongues are at least partially exposed when the ring 7 is caused to assume the second position of FIG. 6 or is away from the first position of FIG. 1.

An important advantage of the improved coupling is that, when the pipe 2 is inserted into the sleeve 4 and the ring 7 is moved to the first or operative position of FIG. 1, the arms 8 bear against the pipe due to their innate resiliency and also under the action of the elastic prongs 27. This automatically compensates for manufacturing tolerances as well as for wear upon the sleeve 4, ring 7 and pipe 2. Furthermore, the pipe 2 is held against tilting or other stray movements relative to the sleeve 4, and the O-ring 6 is stressed uniformly all the way along the internal surface of the end portion 20 of the deforming member 5. Therefore, the likelihood of leakage is much less pronounced than in conventional couplings. It has been found that the pipe 2 remains coaxial with the sleeve 4 even if the one or the other of these parts is acted upon by substantial radial forces which tend to incline the axis of the pipe relative to the axis of the sleeve and/or vice versa.

Another important advantage of the improved coupling is that the coupling can be assembled or taken apart without the application of large forces. Thus, a relatively small force is necessary to move the ring 7 between its first and second positions because this merely involves some flexing of the prongs 27, and a relatively small force is necessary to insert the pipe 2 into or to extract the pipe from the sleeve 4 because the applied force must merely overcome the resistance of the arms 8 to flexing by the rib 3. The improved coupling can dispense with one or more springs which are used in heretofore known couplings in order to urge the locking element to the operative or to the inoperative position. This reduces the initial and assembly costs. Additional savings are achieved in that the prongs 27 are of one piece with the ring 7 and in that the arms 8 are of one piece with the two portions (including the wall 10) of the sleeve 4.

A further advantage of the improved coupling is that the person in charge of assembling the coupling or of supervising the assembly of the coupling can readily ascertain whether or not the rib 3 is properly engaged by the arms 8 as well as whether or not the projections 28 are properly received in the respective recesses. Thus, radially inward movements of the arms 8 in response to axial movement of the pipe 2 from the position of FIG. 7 to the position of FIG. 1 or 8 (so that the rib 3 is received in the grooves 9) entail the generation of a sound which is or can be made readily detectable to thus indicate that the insertion of the pipe 2 into the sleeve 4 is completed. Analogously, advancement of the projections 28 over the respective hurdles 14 and into the respective recesses 13 and/or engagement of the projections 28 with the respective stops 16 generates or can generate a readily detectable sound which informs the person in charge that the shifting of the ring 7 to its first or operative position is completed. Penetration of the rib 3 into the grooves 9 and/or penetration of the projections 28 into the respective recesses 13 is also felt by the hand of the person inserting the pipe 2 into the sleeve 4 and thereupon shifting the ring 7 to the position of FIG. 1 so that such person is even more reliably informed that the insertion of the pipe is completed and that the shifting of the ring 7 to locking position is completed.

The arrangement may be such that a relatively small force is necessary to spread the arms 8 apart by the rib 3 during introduction of the pipe into the sleeve 4, and that a greater force is required to advance the projections 28 over the ramps 15 and hurdles 14 so that the projections snap into the respective recesses 13. This ensures that the ring 7 can be moved to the first or operative position of FIG. 1 only after the rib 3 has already entered the grooves 9 of the arms 8. Therefore, the operator need not exert a substantial force because insertion of the pipe 2 into the sleeve 4 precedes the shifting of the ring 7 to the first position of FIG. 1, i.e., a relatively small force is applied first and is followed by the application of a preferably greater force which is required to introduce the projections 28 into the respective recesses 13.

Certain advantages of the grooves 9 were already pointed out above. The provision of such grooves exhibits the additional advantage that the inserted pipe 2 is invariably located in an optimum position relative to the sleeve 4, deforming member 5, O-ring 6 and hose 1. The left-hand half 9a of the surface bounding a groove 9 acts not unlike a stop (analogous to the stops 16) which opposes further movement of the pipe 2 in a direction toward the hose 1. Analogously the right-hand half 9b of the internal surface bounding a groove 9 opposes accidental extraction of the pipe 2 from the sleeve 4, i.e., it is necessary to apply a certain force in order to extract the pipe 2 even after the ring 7 is already shifted to the second or inoperative position of FIG. 2.

The tongue or tongues 26 exhibit the advantage that they automatically prevent unintentional shifting of the ring 7 from the first position of FIG. 1 to the second position of FIG. 6. Thus, such tongue or tongues replace coil springs or other types of resilient elements which are used in conventional couplings to prevent unintentional shifting of the locking element from its operative position. The operator in charge of disengaging the pipe 2 from the hose 1 knows that she or he must employ a finger or a tool in order to depress a tongue 26 to the radially inner position of FIG. 8 before the ring 7 can be shifted from the position of FIG. 1 to the position of FIG. 6. As mentioned above, the innate resiliency of each tongue 26 is preferably such that the tongue tends to assume the radially outer position of FIG. 1; this ensures that the ring 7 is automatically locked in the first or operative position as soon as the projections 28 snap into the respective recesses 13 and are held against further movement by the respective stops 16 on the one hand and by the respective hurdles 14 on the other hand.

FIGS. 9 through 19 show the details of a modified coupling wherein the ring 7' must be turned (rotated) rather than reciprocated between its first (FIG. 9) and second (FIGS. 18, 19) positions. All such parts of the second coupling which are identical with the corresponding parts of the coupling of FIGS. 1-8 are denoted by similar reference characters, and the parts which depart from the corresponding parts of the coupling of FIGS. 1-8 are designated by similar reference characters each followed by a prime.

The arms 8' on the sleeve 4' have circumferentially extending channels 12' (in contrast to the axially parallel channels 12 in the arms 8 of the sleeve 4) and axially parallel recesses 13' (in contrast to the circumferentially extending recesses 13 in the external surfaces of the arms 8). The ramps 15', the hurdles 14' and the stops 16' extend in parallelism with the axis of the sleeve 4' (in contrast to the ramps 15, hurdles 14 and stops 16 which extend circumferentially of the sleeve 4). The slots 31 are not necessary. The ring 7' has a first opening 30 and a second opening 33 a short distance away from the opening 30, as seen in the circumferential direction of the ring (see FIGS. 15, 17 and 19).

Figure 9:
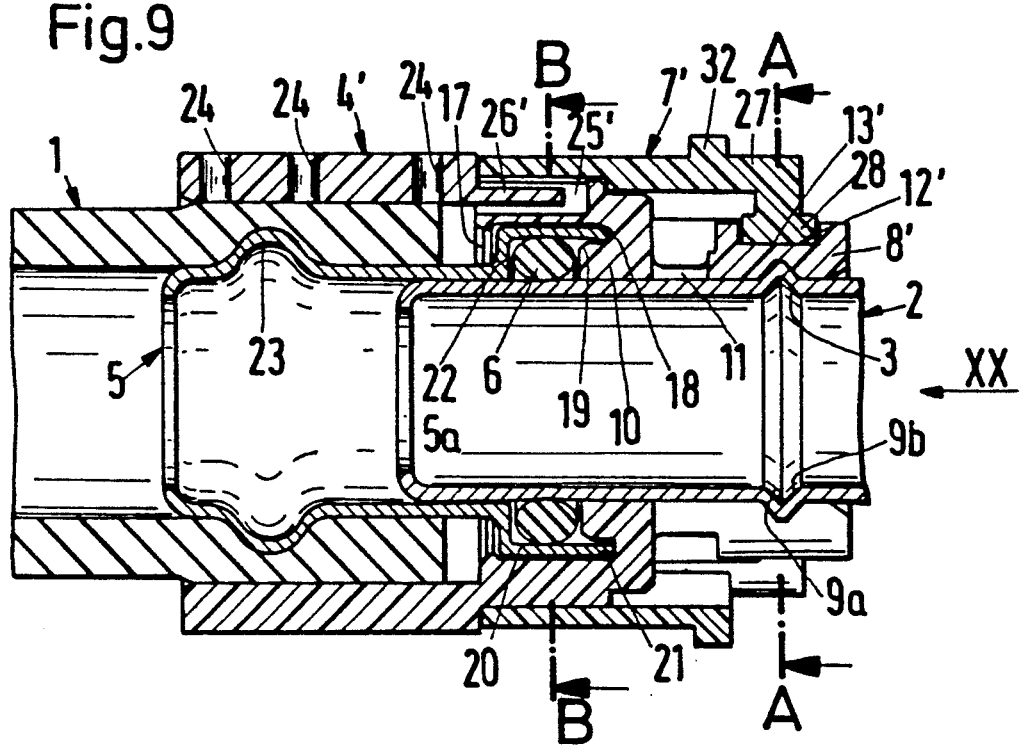
FIG. 9 is an axial sectional view of a second coupling which is installed between one end of a flexible hose and one end of a metallic pipe, the locking element being shown in the first position and the tongue of the tubular member being shown in the radially outer position.
Figure 10:
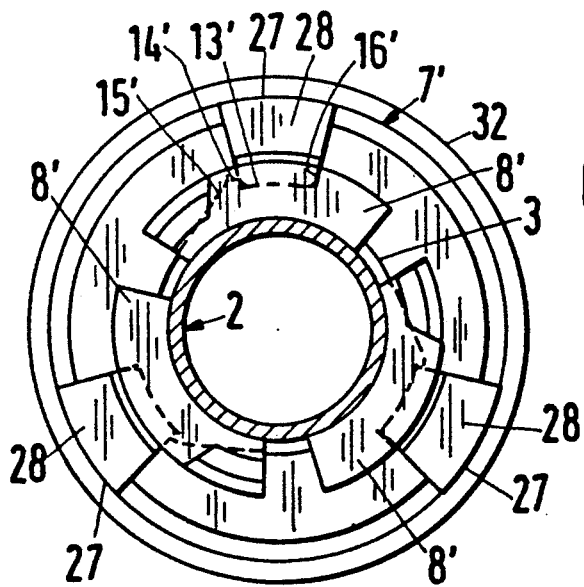
FIG. 10 is an end elevational view of the second coupling as seen in the direction of arrow XX in FIG. 9.
Figure 11:
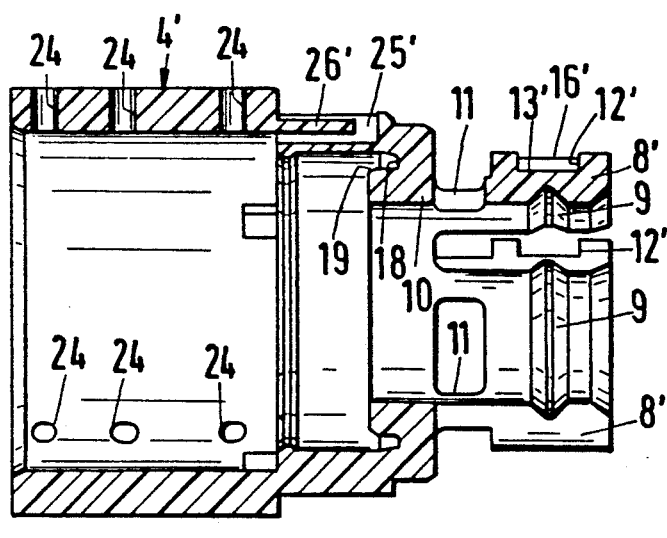
FIG. 11 is an axial sectional view of the tubular member in the coupling or FIGS. 9 and 10.
Figure 13:
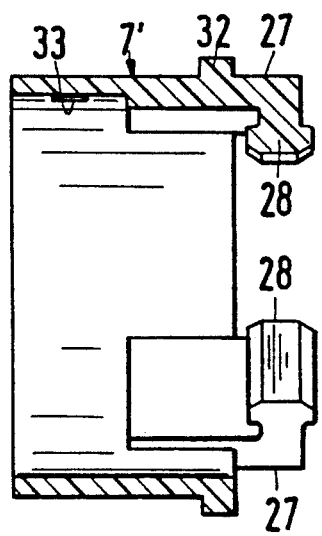
FIG. 13 is an axial sectional view of the locking element in the coupling which is shown in FIGS. 9 and 10.
Figure 12:
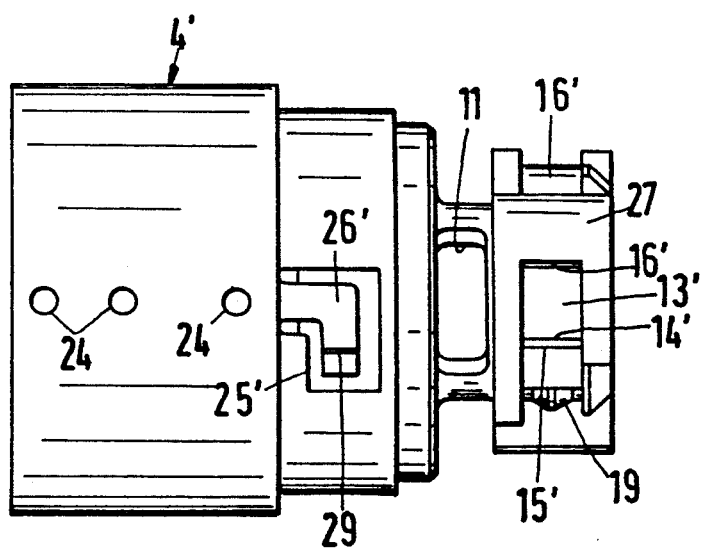
FIG. 12 is a plan view of the tubular member which is shown in FIG. 11.
Figure 14:
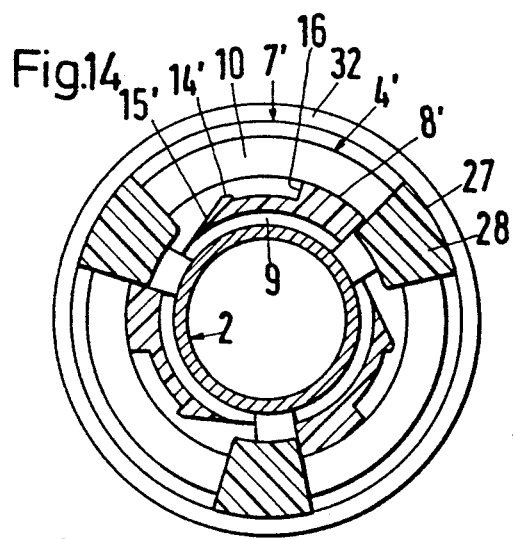
FIG. 14 is a sectional view as seen in the direction of arrows from the line A—A in FIG. 9 but with the external retaining rib of the pipe disengaged from the arms of the tubular member and with the locking element in an angular position other than that shown in FIG. 9.
Figure 15:
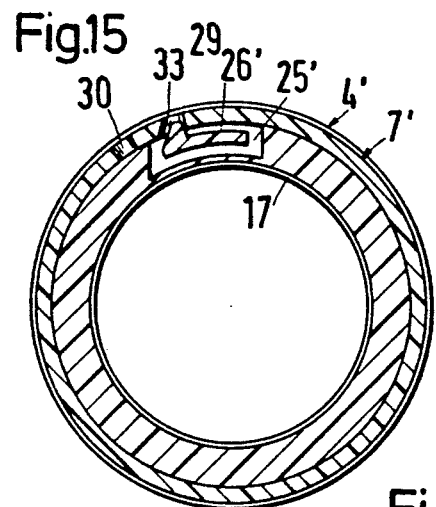
FIG. 15 is a sectional view as seen in the direction of arrows from the line B—B of FIG. 9 with the pipe omitted and with the locking element in the angular position of FIG. 14.
Figure 16:
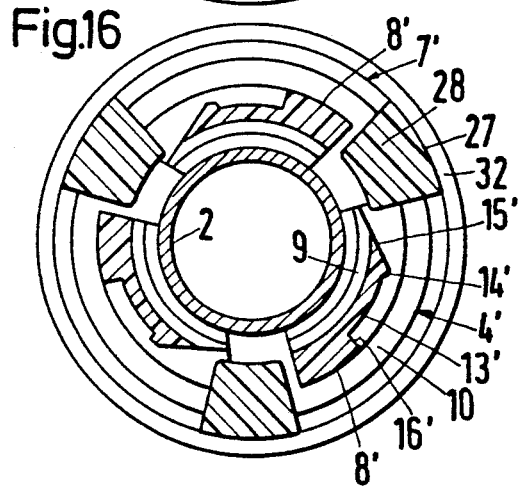
FIG. 16 is a sectional view corresponding to that of FIG. 14 but with the pipe in a different axial position in which the arms are spread apart by the external retaining rib of the pipe and with the locking element in a slightly different angular position.
Figure 17:
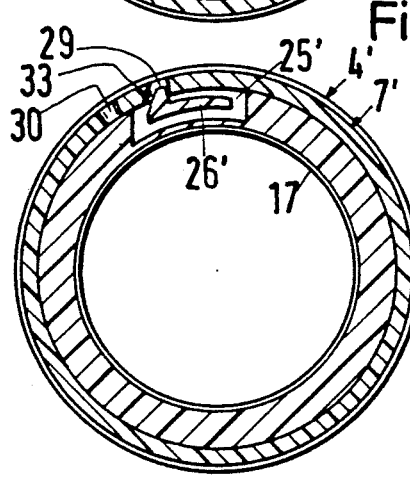
FIG. 17 is a sectional view similar to that of FIG. 15 but with the pipe omitted and with the locking element in or close to the angular position of FIG. 16.
Figure 18:
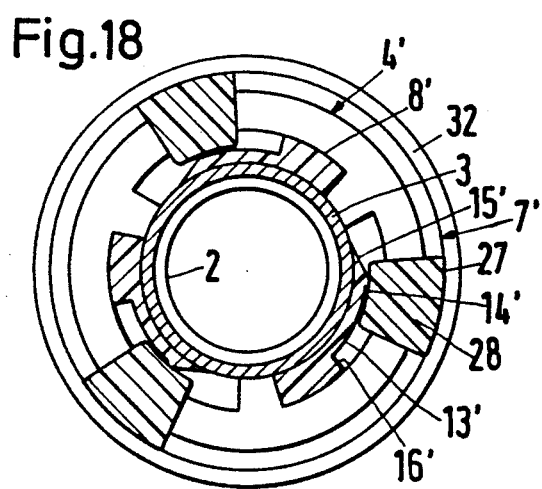
FIG. 18 is a sectional view corresponding to that of FIG. 14 or 16 but with the pipe in the axial position of FIG. 9 and with the locking element in an angular position between the angular positions of FIGS. 10 and 16.
Figure 19:
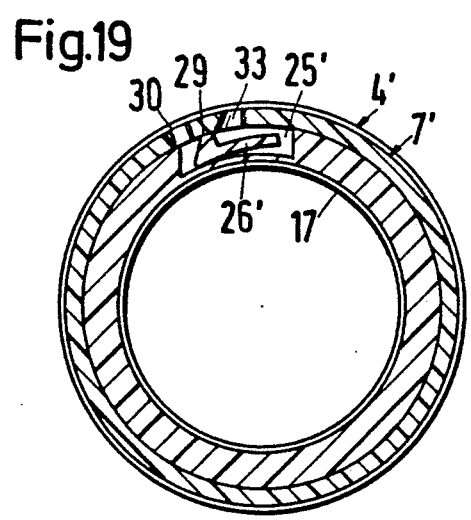
FIG. 19 is a sectional view corresponding to that of FIG. 15 or 17 with the pipe omitted and with the locking element in the angular position of FIG. 18.

The coupling of FIGS. 9 to 19 is manipulated as follows:

The sleeve 4' is assembled with the hose 1 and with the deforming member 5 in the same way as described in connection with FIGS. 1 to 8, and the O-ring 6 is assumed to be located in the compartment or chamber 22 between the walls 5a and 10. The ring 7' is maintained in the angular position of FIGS. 14 to 17 while the pipe 2 is introduced into the ring 4' (and/or the ring is slipped onto the pipe). Insertion of the pipe 2 is terminated when the rib 3 enters the grooves 9 of the arms 8' (FIG. 9). FIGS. 14 and 15 illustrate the sleeve 4' and the pipe 2 in axial positions in which the rib 3 is still located to the right of the grooves 9 (as viewed in FIG. 9). FIGS. 16 and 17 illustrate those axial positions of the sleeve 4' and pipe 2 relative to each other in which the rib 3 is in the process of moving the arms 8' radially of and away from the axis of the sleeve 4' (compare FIG. 7) but the grooves 9 are yet to receive portions of the rib 3. The next stage is shown in FIGS. 9, 18 and 19, i.e., the rib 3 is received in the grooves 9 of the arms 8' and the ring 7' is ready to be turned in order to move from the second position of FIGS. 14–17, through the intermediate position of FIGS. 18–19, to the first position of FIG. 9. At such time, the protuberance 29 of the tongue 26' is caused to leave the opening 33 of the sleeve 4', to remain temporarily depressed (note the radially inner position of FIG. 19) and to thereupon move outwardly due to innate elasticity of the tongue 26' and to enter the opening 30 when the ring 7' reaches the first angular position of FIG. 9. The ring 7' is rotated in a clockwise direction, as viewed in FIGS. 15 to 19. The just described turning of the ring 7' relative to the sleeve 4' entails a movement of the projections 28 of the prongs 27 first over the respective ramps 15', thereupon over the respective hurdles 14' and ultimately into the respective recesses 13' until the projections 28 reach the respective stops 16' on the corresponding arms 8'.

Presence of the protuberance 29 on the tongue 26' in the opening 30 of the sleeve 4' indicates to an inspector, to a worker or to an automatic monitoring device that the ring 7' has assumed its first position and that the pipe 2 is securely coupled to the hose 1. On the other hand, absence of the protuberance 29 from the opening 33 is indicative that the ring 7' is out of its second position. As mentioned above, the tongue (such as the protuberance 29 of the tongue 26') can carry a spot of coloring matter which can be readily detected when the protuberance 29 is confined in the hole 30 of the sleeve 4' to further simplify and facilitate detection of the angular position of the ring 7' and hence of the condition of the coupling.

If it is desired to disengage the pipe 2 of FIG. 9 from the sleeve 4' and hose 1, the protuberance 29 of the tongue 26' is expelled from the opening 30 by moving it radially inwardly to the position of FIG. 19 so that the ring 7' can be readily rotated from the angular position of FIG. 9, through the intermediate position of FIG. 19 and on to the angular position of FIG. 15 or 17. This releases the arms 8' so that a pull upon the pipe 2 suffices to spread the arms 8' apart by the rib 3 and to thereupon complete the extraction of the pipe. The protuberance 29 of the tongue 26' snaps into the opening 33 when the ring 7' reaches the second position of FIGS. 15 and 17 to thus ensure that the ring remains in such angular position until it is turned with a certain force which is required to expel the protuberance 29 from the opening 33 as a result of engagement of a ramp on the protuberance 29 with a complementary ramp in the opening 33.

In all other respects, the operation of the coupling of FIGS. 9 to 19 is identical with or clearly analogous to that of the coupling which is shown in FIGS. 1 to 8. Thus, the arms 8' tend to move toward the peripheral surface of the pipe 2 due to their innate elasticity, and the projections 28 on the prongs 27 also tend to move radially inwardly to urge the respective arms 8' toward the external surface of the properly inserted pipe. Such engagement of the arms 8' by the projections 28 is desirable and advantageous because the pipe 2 is not likely to be tilted relative to the sleeve 4' and relative to the adjacent end portion of the hose 1 which, in turn, ensures uniform stressing of the O-ring 6 between the pipe 2 and the cylindrical portion 20 of the deforming member 5 to reduce or eliminate the likelihood of leakage of fluid from the pipe and sleeve into the surrounding atmosphere or in the opposite direction.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A coupling for connecting an end of a first tubular component with a second tubular component having an end provided with an external retaining part, comprising a tubular member including a first end portion connectable with the end of the first component and a second end portion arranged to receive the end of the second component and substantially axially extending radially flexible elastic arms yieldably engaging the retaining part when the second end portion receives the end of the second component, said arms being of one piece with said second end portion; at least one annular sealing element receivable between the second end portion of said member and the end of the second component; an annular locking element surrounding and movable relative to said member between first and second positions; and elastic prongs of one piece with and extending substantially axially of and beyond said locking element, each of said prongs overlying and yieldably bearing against one of said arms in the first position but permitting radially outward movement of the respective arm in the second position of said locking element.

2. The coupling of claim 1, wherein at least one of said prongs has an internal projection and at least one of said arms has an external hurdle over which the at least one projection is caused to advance during movement of said locking element between said first and second positions.

3. The coupling of claim 1, further comprising means for preventing movements of said locking element beyond said first position in a direction away from said second position.

4. The coupling of claim 3, wherein said preventing means comprises a stop on at least one of said arms.

5. The coupling of claim 1 wherein the external retaining part includes a circumferentially extending rib, wherein said arms have inner sides provided with grooves which receive portions of the rib when the end of the second component is received in the second end portion of said member.

6. The coupling of claim 1, wherein said member has a window and a tongue in said window, said tongue being movable relative to said window between a radially outer position to block the movement of said locking element to said second position and a radially inner position in which said locking element is free to move to said second position.

7. The coupling of claim 6, wherein said tongue is elastic and is of one piece with the end portions of said member.

8. The coupling of claim 6, wherein said tongue is elastic and tends to assume said radially outer position.

9. The coupling of claim 6, wherein said locking element at least partially conceals said tongue from view in one of said first and second positions thereof.

10. The coupling of claim 6, wherein said locking element at least partially conceals said tongue from view in the second position thereof.

11. The coupling of claim 1, wherein said locking element has at least one follower and said member has means for guiding said at least one follower so that the at least one follower and the guiding means confine said locking element to movements along a predetermined path between said first and second positions.

12. The coupling of claim 11, wherein said at least one follower includes a projection and said guiding means comprises a track for said projection.

13. The coupling of claim 12, wherein said projection is provided on one of said prongs.

14. The coupling of claim 1, wherein said locking element is rotatable relative to said member between said first and second positions thereof.

15. The coupling of claim 1, wherein said locking element is reciprocable relative to said member between said first and second positions thereof.

16. The coupling of claim 1, wherein said member has at least one socket and further comprising means for deforming a portion of the end of the first component into said at least one socket to thus establish a form-locking connection between said member and the first component.

* * * * *